United States Patent [19]

Searle

[11] Patent Number: 5,468,334

[45] Date of Patent: Nov. 21, 1995

[54] FRICTION WELDING

[75] Inventor: John G. Searle, Cannock, England

[73] Assignee: Rolls-Royce plc, London, England

[21] Appl. No.: 242,342

[22] Filed: May 13, 1994

[30] Foreign Application Priority Data

May 13, 1993 [GB] United Kingdom .................. 9309864

[51] Int. Cl.⁶ .................................................. B23K 20/12
[52] U.S. Cl. ..................... 156/580; 156/73.5; 156/580.2; 228/2.1; 228/112.1; 228/44.3; 269/37; 269/41
[58] Field of Search ............................ 156/73.5, 580.2, 156/580; 228/2.1, 112.1, 2.3, 44.3, 113, 114.5; 264/68; 269/37, 41, 87, 104, 134

[56] References Cited

U.S. PATENT DOCUMENTS

| | | | |
|---|---|---|---|
| 4,239,575 | 12/1980 | Leatherman | 156/272 |
| 4,905,883 | 3/1990 | Searle | 228/2.1 |
| 4,995,544 | 2/1991 | Searle | 228/2.1 |
| 5,148,957 | 9/1992 | Searle | 228/2.1 |

Primary Examiner—David A. Simmons
Assistant Examiner—J. Sells
Attorney, Agent, or Firm—Oliff & Berridge

[57] ABSTRACT

A workpiece holder for angularly reciprocatory friction welding apparatus includes clamp members for clamping the workpiece to a mounting table. The height and circumferential position of a drum is adjustable to facilitate blade attachment in manufacture of a blum. Means are also described for reinforcing the drum during blade attachment in order to absorb welding forces which might otherwise distort the drum surface.

15 Claims, 5 Drawing Sheets

FRICTION WELDING

This invention relates to improvements relating to friction welding.

It has been known for many years that two components, even metal components can be welded together by reciprocating at least one of the components and urging the components together, the frictional heat generated between the components melting the material of at least one component, and more usually both components, so as to form a friction weld. One example of a technical field in which friction welding is currently seen as having useful applications is in the field of making compressors or turbines for aircraft engines. Compressor assemblies may comprise a blisk (blades plus integral disc), or a blum (blades plus integral drum) which is effectively several blisks joined together.

According to a first aspect of the invention we provide a component holder for holding a component during friction welding comprising a first clamp member and a second clamp member separable from the first clamp member so as to receive in use between the clamp members a component to be welded.

The clamp members are preferably entirely separable. Preferably clamp force means is provided to urge the two clamp members towards each other, into clamping engagement with the component.

The clamp members are preferably arranged to clamp the component around a ring region of the component, preferably in substantially continuous contact with the component at the ring region. They may have an annular clamping ring.

The clamping force exerted in use by the clamp members is preferably so great that weld pressure and weld reciprocatory friction forces on the component held are relatively small in comparison.

The clamp members may comprise an upper and a lower clamp member. The clamp members may be of a drum-like structure, with the component being received inside them, or one of them.

The clamp members may be mounted on a workpiece mounting member via a separable, or indexable coupling.

The lower clamp member may have a ring of locating formations provided which engage a complementary ring of complementary locating formations on the workpiece holding member. The formations (and complementary formations) are preferably equi-angularly spaced. The lower clamp member may be movable away from the workpiece holding member so as to index the clamp members (and associated workpiece) between allowable index positions, and movable back towards the workpiece holding member so as to allow welding.

According to another aspect of the invention a friction welding apparatus comprises a body having a mounting region adapted to mount a workpiece for friction welding, and workpiece clamping means comprising clamping force generating means provided at a region of the body disposed away from the mounting region and an elongate clamping force-transmitting member adapted to transfer a clamping force which clamps the workpiece to the mounting region from the clamping force generating means to the mounting region.

Preferably the force-transmitting means pulls the workpiece against the mounting region. The force-transmitting means may have a head or shoulder formation which engages in use a complementary formation on the workpiece-holding clamp means adapted to hold the workpiece.

The force transmitting means may be movable between the clamping position in which the workpiece or workpiece-holding clamp means are held rigid with the mounting region, and a release position in which they are not.

The above invention may also be expressed as a method of friction welding.

According to a further aspect of the invention we provide workpiece mounting means for friction welding apparatus comprising means defining a chamber or recesses adapted to receive in use a workpiece to which a component is to be welded.

Thus the workpiece extends in use into the chamber.

The mounting means may comprise a bucket-like structure and may be adapted to move. The mounting means may be adapted to move angularly about an axis, and most preferably to reciprocate angularly for angular friction welding. The mounting means may be mounted on a mounting base via bearings, such as hydrostatic or film bearings.

A support structure may be provided in the chamber or recess under the workpiece. Support structure of different sizes may be used for workpieces of different sizes so as to raise the region to be welded above the top of the chamber (or raise successive regions of the same workpiece to a welding height). The support structure may be of adjustable height, for example comprising an adjustable base.

According to another aspect of the invention a method of holding a workpiece to be friction welded to a component comprises holding the workpiece in a recess or hole in a workpiece mounting means with part of the workpiece in the chamber and the part of the workpiece to which the component is to be welded being accessible from outside of the chamber.

Preferably the workpiece projects outside of the chamber.

According to another aspect of the invention we provide a method of holding a component to be welded in friction welding where the component is urged against another component with a weld-pressure generating force and relative friction-generating cyclical motion occurs between the two components to generate welding heat, the method comprising holding the component using frictional forces acting in the generally opposite direction to the weld-pressure generating direction.

Thus the frictional gripping force on the component by component holding means is at least as great as the weld-compression generating force.

The above invention may be expressed as apparatus to hold the workpiece via friction, or to hold the outside of the workpiece.

The above aspects of the invention are especially, but not exclusively, suited to welding blades onto air compressor assembly discs or drums for aircraft engines and the like.

A number of further inventions have arisen for work connected with trying to friction weld blades to drums to produce blums or blisks for compressor or turbines for engine, for example for aircraft.

A blum typically has a thin outer cylindrical wall, perhaps 3 mm or 4 mm thick. In friction welding a turbine blade to the drum radial weld-pressure generating forces are generated of the order of, perhaps, 15 tonnes. This will distort an unsupported blum. It has been proposed to pressurise the inside of the blum, or to fill it with, for example, a low-melting paint support metal to provide temporary support. We do not accept that either of these proposals are as good as the present proposals.

According to an aspect of the invention we provide a method of friction welding a blum (or other deformable object having an interior and an exterior) comprising supporting the blum from the outside.

Preferably the support is at or adjacent the region of the blum (or other object) at which friction welding is occurring.

The support may be provided above and/or below a plane in which relative reciprocate movement occurs between the blum (or other object) and the component.

Additionally or alternatively the blum may be supported in the reciprocatory plane.

Apparatus to achieve the above may be provided and we wish to protect that as well as the method.

According to a still further aspect of the invention a method of friction welding a component, such as a blade, to a workpiece, such as a blum, comprising applying a plurality of inwardly directed compression forces to the workpiece, arranging for relative friction-generating movement to occur between the workpiece and the component, and during the workpiece and component relative towards each other to generate a welding pressure, the resultant of said inwardly directed forces applied to the workpiece having a component in the opposite direction to the weld force applied by the component during welding.

Preferably the resultant of the said plurality of compression forces substantially equals the weld force, but acts in substantially the opposite direction.

Preferably the compression forces are applied to the workpiece at substantially regular angular spacings, with the weld force taking the angular place of one of the compression forces.

Preferably the weld force is of the same magnitude as a compression force. Most preferably the compression forces and weld force are all of substantially the same amount.

The method also preferably comprises moving compression members adapted to generate the compression forces to predetermined positions. Thus the workpiece is forced to take up a predetermined configuration.

There are preferably many compression forces, preferably at least 2, or 3 or more, and most preferably at least 7 or more, or at least 11 or more.

The compression forces are preferably equi-angularly spaced and directed to the centre of the body of the workpiece (or at least to the centre of its cross-section in the welding plane).

The method is especially, but not exclusively, applicable to welding to hollow workpieces, and to welding to generally symmetric workpieces, such as cylindrical workpieces.

The size of the compression forces may be controlled so as to vary during a welding operation.

Apparatus to achieve the above may be provided and we also wish to protect that.

Preferably the compression members are forced inwards until a stop is reached. They are preferably moved simultaneously, or at least in groups or pairs (perhaps symmetrically disposed groups).

It will be appreciated that in the above method of supporting a workpiece we support from the outside instead of (or as well as) from the inside of the workpiece.

Looked at in one way, the invention effectively comprises compressing the workpiece in a multi-jawed chuck, with one of the jaws of the chuck having its place taken by the component to be welded and the weld force.

The method may comprise removing a compression member to allow friction welding to occur at or adjacent its location. The method may also comprise introducing a compression member at or adjacent a region of the workpiece where a component has been welded.

According to a still further aspect of the invention a method of supporting a hollow workpiece during friction welding comprises providing an internal support wall extending around the inside periphery of the workpiece at or adjacent the region of the workpiece at which the weld occurs.

The support wall may extend around only a part of the internal surface of the workpiece or may extend completely around the internal periphery of the workpiece, and may be a ring. When the workpiece has a circular cross-section the support wall may be an annular ring.

The support wall may be made from separate building blocks which the user introduces into the workpiece to build up the support wall.

The invention also resides in a method of strengthening a hollow workpiece to be friction welded, and in apparatus, or a kit of parts, for doing so.

According to another aspect the invention comprises a method of friction welding blades to a drum of a blum which has an internal diaphragm or spoked disc, the method comprising compressing the blum in a radial plane and deliberately urging the diaphragm or disc out of its plane so as control the direction of its flexing when the blum is compressed.

According to a further aspect of the invention we may arrange for the diaphragms or other internal support structures of a hollow article, such as a blum, to be deflected during a friction welding operation so that they provide an outwards radial force with at least a component of force in the opposite direction to that in which a component to be welded to the article is urged relative to the outer surface of the article.

Thus we can stress the internal support structures so that they provide a radial force to counter the weld pressure force.

For example, the internal diaphragms(s) of a blum could have a relaxed condition in which they are curved out of a plane and we could force them back towards a flat configuration (and ideally taking a flat configuration) during welding, or just before welding.

This idea of forming internal structures into a generally radial plane so as to generate radially outwardly directed force could be used to support other hollow articles when they are to experience compressive forces during a manufacturing process, or when in their final use.

Embodiments of the invention will now be described by way of example only with reference to the accompanying drawings of which:

FIG. 1b shows a detail variation of the arrangement of FIG. 1a;

In general terms, friction welding comprises rubbing two components together so that the frictional heat generated causes a weld. It is usual to press the two components together to increase the friction. In the following examples a first component, which is a turbine blade, is welded to a second component (or workpiece) such as a disc or drum of a turbine. In the examples the first component is urged radially towards the workpiece with a weld pressure generating force and the workpiece is reciprocated so as to cause relative movement between the workpiece and the component. Of course, so long as the relative forces exist the effect can be achieved by, for example, reciprocating the same component as is urged radially, reciprocating both components, orbiting one of the components instead of reciprocating it etc.

Figure 1A:
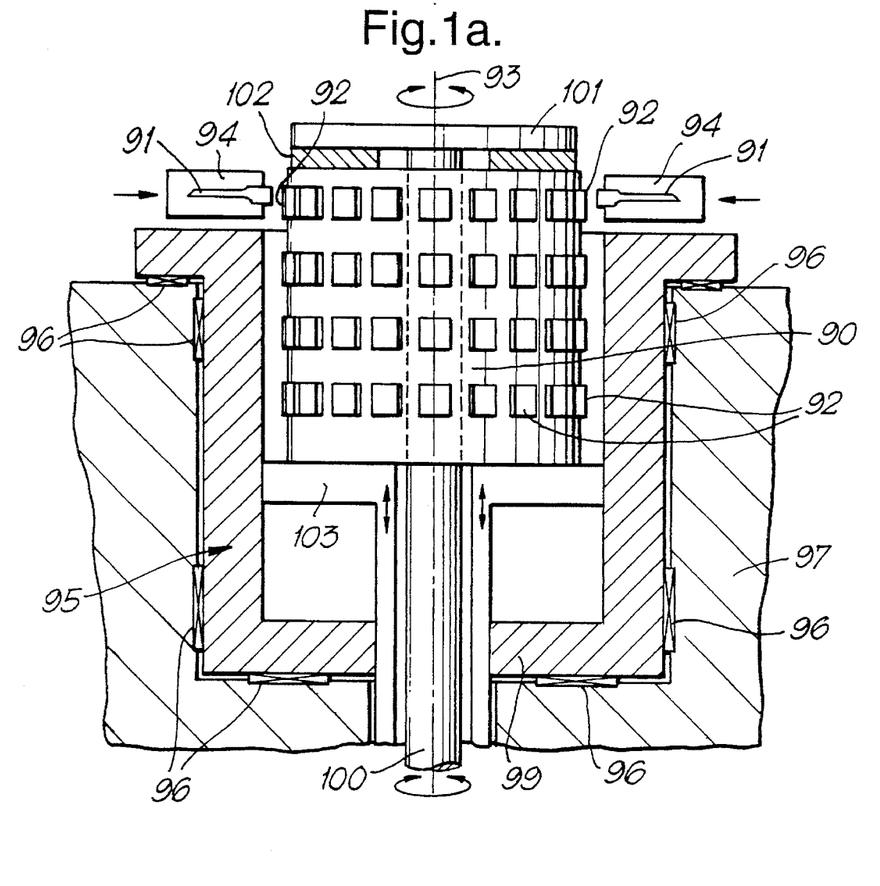
FIG. 1a shows a workpiece holding arrangement.
Figure 1B:
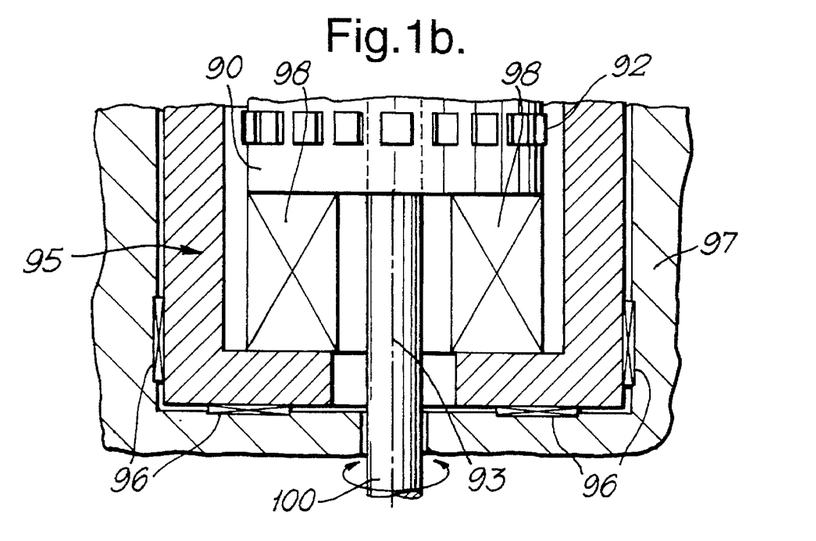

FIGS. 1a and 1b show a new workpiece holding arrangement which could be used in combination with angular friction welding apparatus (which concept is new and inventive) or with a more conventional friction welding apparatus such as linear friction welding apparatus.

A drum 90 of an axial air flow compressor to which compressor blades 91 are friction welded to form a blade plus integral drum (blum) is shown. The drum 90 has raised weld receiving plateaux 92 arranged around its periphery (although we may prefer to have a continuous surface, for example an annular rim). The blades 91 are clamped in directions transverse to a radial direction relative to angular friction welding about an axis 93 by component holders 94 which urge the blades radially against the weld-receiving plateau 92 which is in the welding location to generate a weld pressure.

The workpiece holder comprises a bucket or drum 95 mounted on hydrostatic or film bearings 96 provided in a support frame or member 97. An annular spacer block 98 FIG. 1b or series of blocks rests on a base 99 of the bucket and supports the annular bottom edge region of the drum 90. Alternatively, or additionally, we may prefer to have an adjustable base platform 103 FIG. 1a. A pull rod 100 extends through the hole in the centre of the drum and terminates in a head 101 which applies a clamping force to the upper annular surface of the drum via a force spreading annular member 102.

The side walls, and possibly the case, of the drum 95 may also have clamp members to engage the sides of the drum 90 and assist in holding it rigid with the drum. Alternatively, the drum may be held fixed to the bucket 95 simply by the frictional force applied by the pull rod 100. The bucket could, of course, be filled with a packing material, such as low melting point metal, to hold the drum, but that is not our preferred arrangement.

Diametrically opposed pairs of blades 91 are welded by moving the entire bucket 95 angularly with reciprocal motion. Angular friction welding especially with a radial component to the weld-pressure force is described in co-pending patent application GB 9309824.2 and GB 9309865.5.

Following a welding operation the drum 90 is indexed around to the next pair of weld-receiving plateau 92 to be welded (these may be the next adjacent pair, or may be further angularly spaced). The next pair of blades 91 are then welded. Once a complete horizontal row of blades is welded the drum 90 is indexed up to the next row so as to bring that to the horizontal position of the component holders 94. This upward, axial, indexing is achieved by raising the adjustable platform base member 98 automatically by axial adjustment means capable of stopping in predetermined allowable axial positions (or continuously variable). Alternatively, the spacer block 98 may be changed for an axially taller, or longer, block or by adding a further spacer block to raise the drum.

We may wish to convert the bucket 95 to be able to weld in a plane normal to the axis about which it reciprocates on top of the drum. A removable conversion plug may be provided to achieve this, the plug fitting in the top of the drum. Component holding means would then be provided on the plug. We may be able to weld on top of the bucket as well as on its sides, and even both simultaneously.

It will be appreciated that the bucket arrangement of the component holder for the blum gives us an opportunity to grip the outside of the side walls of the blum with frictional forces.

Figure 2:
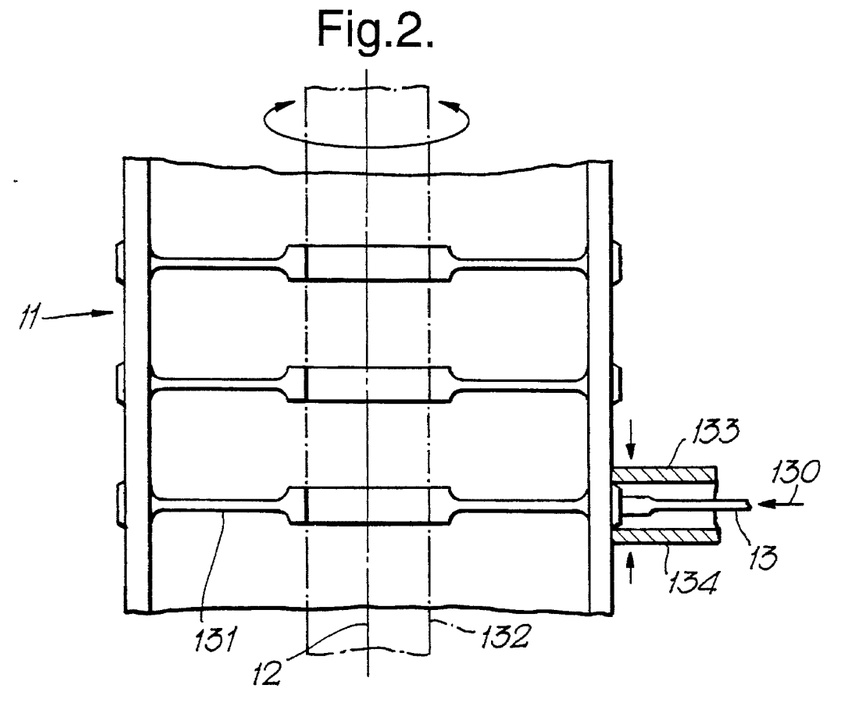
FIG. 2 shows schematically a blade plus integral drum (blum) having a blade welded to it.

FIG. 2 shows another way of friction welding a blade to a drum. The walls of the drum of a compressor may be made of metal which is only 3 mm or 4 mm thick. The radial welding force applied to the friction weld, referenced 130, may be of the order of 15 tonnes. The interior of turbine drums contain stiffening structures such as thin membranes which serve to strengthen the drum against centrifugal/centripetal forces, and may also serve to centre the spinning action of the turbine in use about a central shaft of an engine shown in chain dotted line referenced 132.

The radial weld force which needs to be applied to the drum is so great that it will distort the drum. It has been proposed in the past to support the drum by pressurising it with a gas, or by filling it with a low melting point metal during the weld. We now propose to support the drum from the outside.

FIG. 2 shows support clamp members 133 and 134 extending above and below the plateau 92 to which the blade 13 is to be welded. The support clamp members clamp the top and bottom (radially extending) surfaces of the plateau and restrain it against radial movement, and serve to react the radial weld force 130. The drum, and the support clamp members, may move angularly about the axis 12 to create reciprocatory friction heat. Alternatively the blade 13 may be moved, for example in an out of the page, circumferentially of the drum, as well as being pushed radially or the drum could be pushed radially whilst the blade is reciprocated.

It will be appreciated that the region of the drum adjacent a weld location could be supported instead of supporting the inside of the drum, or as well as doing so.

Figure 3A:
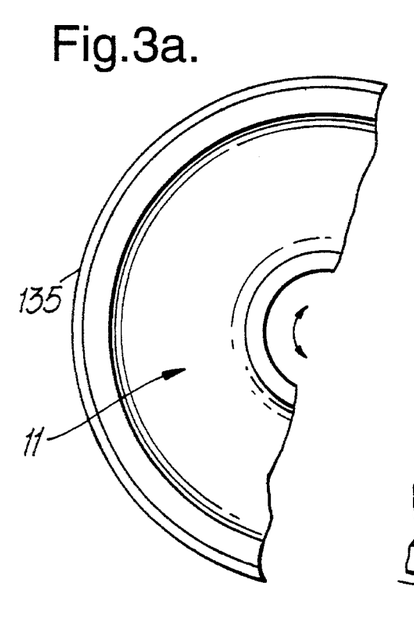
FIGS. 3a and 3b show top view of two alternative structures of the blum of FIG. 2.

It will also be appreciated that instead of having individual plateaux to which blades are welded there may be an annular ridge around the exterior of the drum. The support clamp members 133 and 134 could still operate in that arrangement. FIG. 3a shows an annular ridge 135 which has discrete plateaux.

Figure 3B:
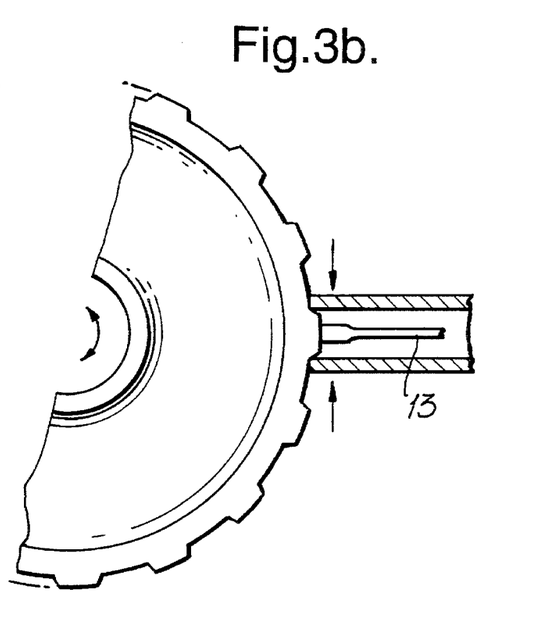

FIG. 3b shows clamping of the circumferentially spaced sides of the plateaux to support them against the radial weld force and to react the force. The component holder for blade 13 has been omitted from FIG. 3b.

It will be appreciated that we could clamp adjacent a weld location. The clamp means may engage the workpiece on the plateau both above and below and to each side of the region to which the blade will be welded so as to prevent local deformation of the drum circumference.

Figure 4:
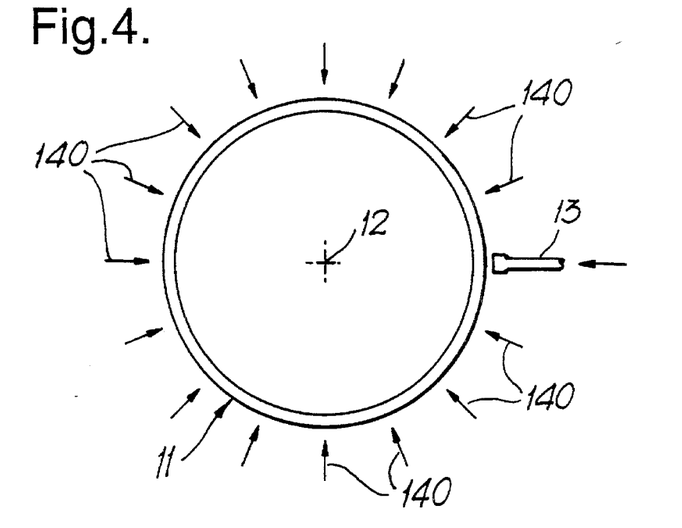
FIG. 4 shows schematically the principle of a new way of friction welding deformable structures.

FIG. 4 shows schematically another significant new principle for friction welding blades to drums. The principle is equally applicable to welding to other compressible articles.

The drum 11 is compressed by a large number of equi-angularly disposed radially directed compression forces represented by arrows 140. The place of one of the compression forces 140 is taken by the blade 13 and the radially directed welding pressure. The magnitude of each compression force 140 is substantially the same as that of the radially directed welding pressure. Thus the welding pressure is necessary to balance the symmetry of the system, instead of unbalancing the system as was done previously.

It will be appreciated that when the disc or drum 11 is to be moved angularly the means producing the radial compression forces 140 may also move angularly with it.

Figure 5:
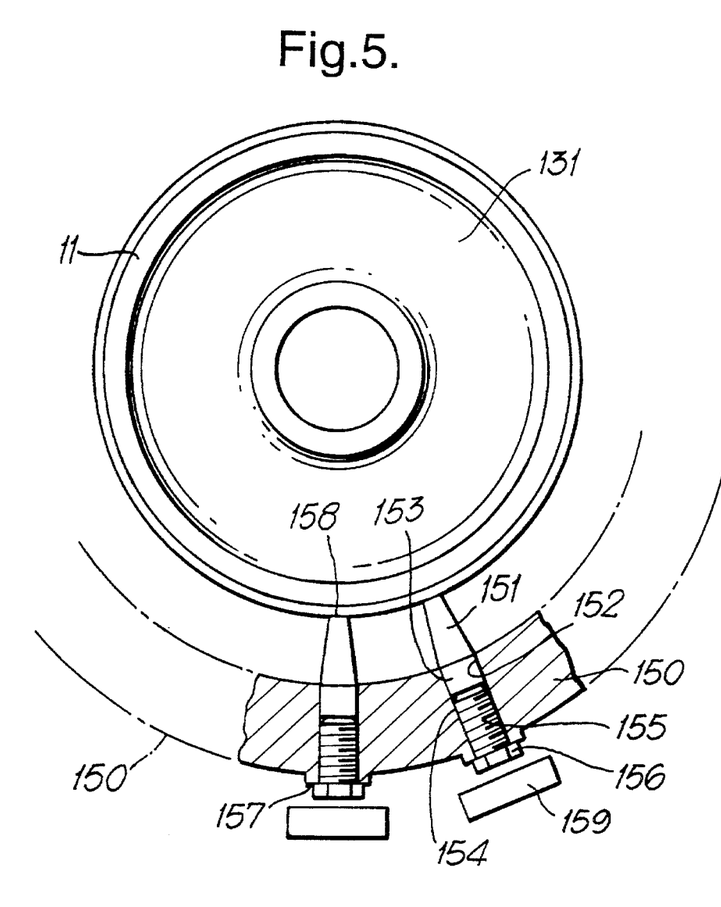
FIG. 5 shows schematically detail of an arrangement for putting into practice the idea of FIG. 4.

FIG. 5 shows one way in which the compression forces 140 could be provided. The compression forces are effectively provided by teeth of a chuck. An annular ring 150 surrounds the drum or disc 11 and has a plurality of equi-angularly spaced radially extending compression pins 151 provided in bores 152 in the plate 150. Pins 151 have a cylindrical portion 153 received in the bores. A radially outer portion of the bores 152 are threaded, shown at 154, and receive screw threaded shanks 155 which have an integral nut 156 at their outer end. The plate 150 has a plurality of stop faces 157 provided at its peripheral outer edge. The radially inner ends of each of the screw threaded members 155 have an abutment face which co-operate with a complementary abutment face on the pins 151. The members 155 are in use screwed down to the stop 157 and this ensures that the inner, arcuate face 158 of the pins 151 lie on a predetermined circle. Thus, the disc or drum 11 is compressed by being forced to occupy, in the plane of the annular plate 150, a predetermined shape and size. Automatic means 159, such as electric or hydraulic motors, are provided to screw the nuts 156 home.

Each of the compression pin and drive mechanism assemblies is removable from the plate and can be replaced with a component holder containing a blade to be friction welded to the disc or drum. This may be achieved by having the pin and associated bore 150 in a plate portion which is separate from the plate ring 150. The plate ring 150 may be made from a plurality of ring segments releasably joined together. This may be a convenient way to interchange any particular compression pin assembly for a component holder and blade.

Alternatively, when the compression pins 151 are retracted so that they do not compress the disc or drum 11 the disc or drum may be indexed to another position to present a different region to the welding station of the ring 150. In this way there would be no need to move the welding station with respect of the ring 150. A way would have to be found of avoiding the blades that are already welded from preventing indexing—perhaps the pins could be moved temporarily to a different axial plane during indexing or equivalent relative movement effected.

We would prefer to move all of the pins 151 simultaneously to their predetermined positions. This may be achieved by suitable control means, or by a mechanical arrangement.

Instead of moving the compression pins 151 to a predetermined position we may advance them to a predetermined force or pressure.

Figure 6:
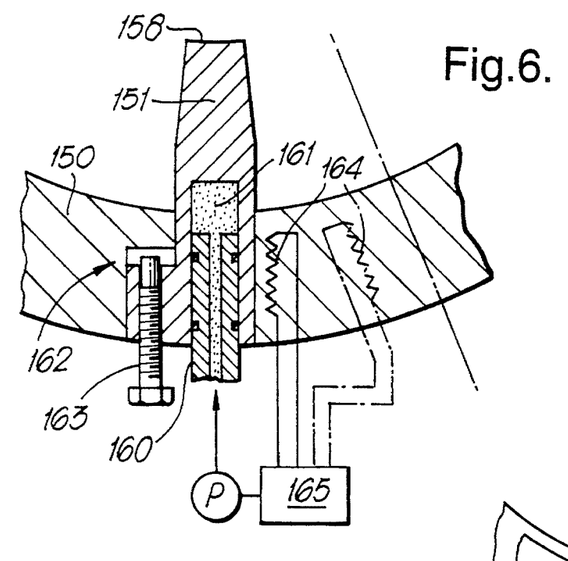
FIGS. 6 to 10 show further possible arrangements for use in connection with the idea of FIG. 4.

FIG. 6 shows a variation on the means for advancing, and stopping, the compression pins 151. In the arrangement of FIG. 6 the ring 150 has a plurality of bores which receive the pins 151. Each pin 151 has an internal bore which defines a chamber 161, in combination with a central projection 160 which may serve to guide the movement of the pin 151, or may not. The chamber contains hydraulic fluid and is connected to a pump P. To advance the pin 151 the hydraulic fluid is pressurised.

The pins 151 each carry an adjustable stop 162. The stop is in this example formed by the co-operation between the end face of a screw threaded bolt 163 received in a bore associated with the pin 151, and a complementary stop face provided on the ring. The position of the stop can be adjusted manually or automatically by screwing the stop in or out.

FIG. 6 also shows electronic monitoring of the position of the pin 151, schematically represented by a potentiometer 164. The potentiometer or other equivalent sensor feeds position signals to a control unit 165 which controls the operation of the pump P. This may be a convenient way of moving all of the pins together. Instead of moving all the pins together we may prefer to move them in predetermined combinations, such as in radially opposed pairs, or in angularly symmetrically disposed groups.

Figure 7:
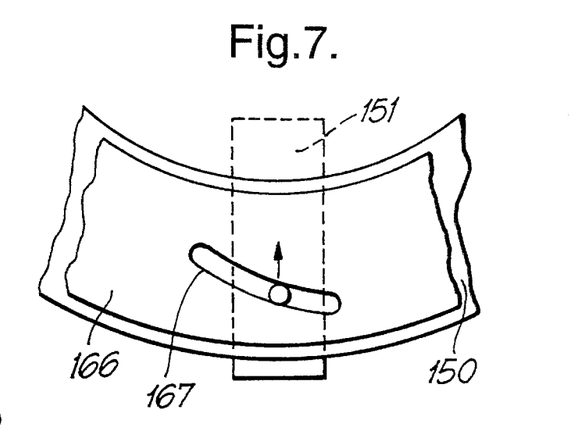

FIG. 7 shows a possible way of arranging for the pins 151 to be moved radially together using mechanical means. A drive plate 166 has a slot 167 which has a radial position which varies with its circumferential length. A projection on the pin is received in the slot. The drive plate 166 is driven around angularly and the pin 151 is thereby driven in radially, being guided in a bore in the plate 150. The drive plate 166 has a slot 167 for each of the pins 151 and operates them all simultaneously.

Figure 8:
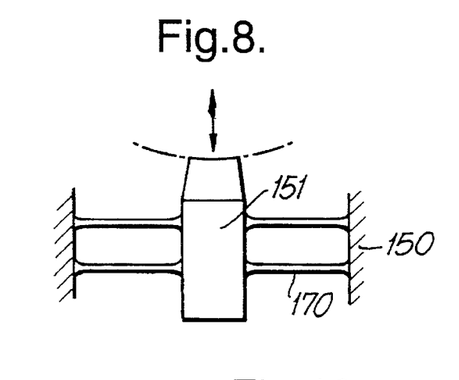
Figure 9:
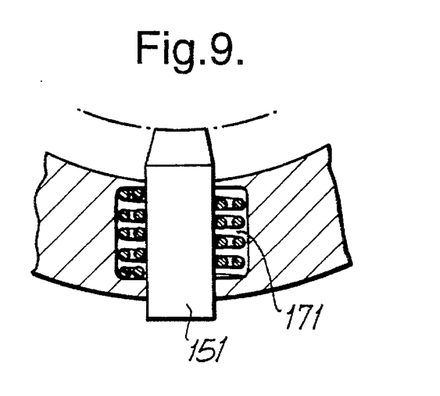
Figure 10:
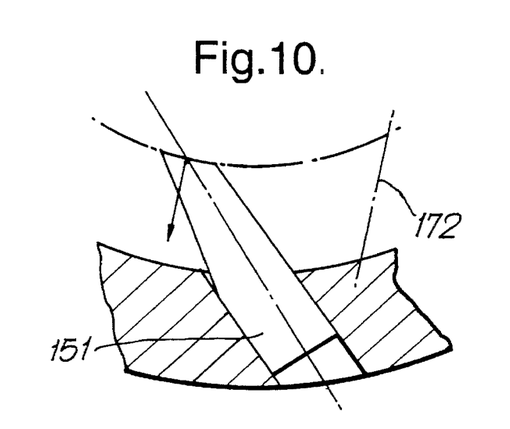

FIGS. 8 to 10 show different ways of allowing the pin, or jaw 151 to move radially. In the arrangement of FIG. 26 the pin or jaw 151 is connected to the ring 150 by flexible blades or bars 170. These allow regular movement of the pin but prevent any circumferential play or backlash. The disc or drum may be reciprocated angularly which could otherwise induce backlash.

In the arrangement of FIG. 9 the pin 151 is guided for radial movement by pre-loaded recirculating bearing assemblies 171 which prevent backlash.

In the arrangement of FIG. 10 the pin 151 is not moved in along a radius, but instead along a line inclined to the radius. This means that any tendency to backlash is removed by the wedging action of the pin in its bore. Since the disc or drum moves in the case of angular friction welding moving firstly in one angular direction and then in the opposite angular direction it may also be necessary to have pins 151 inclined in the opposite direction, as indicated by line 172. There may be a set of pins angled in one direction interlaced with a set of pins angled in the opposite direction.

Figures 11, 12, 13, 14:
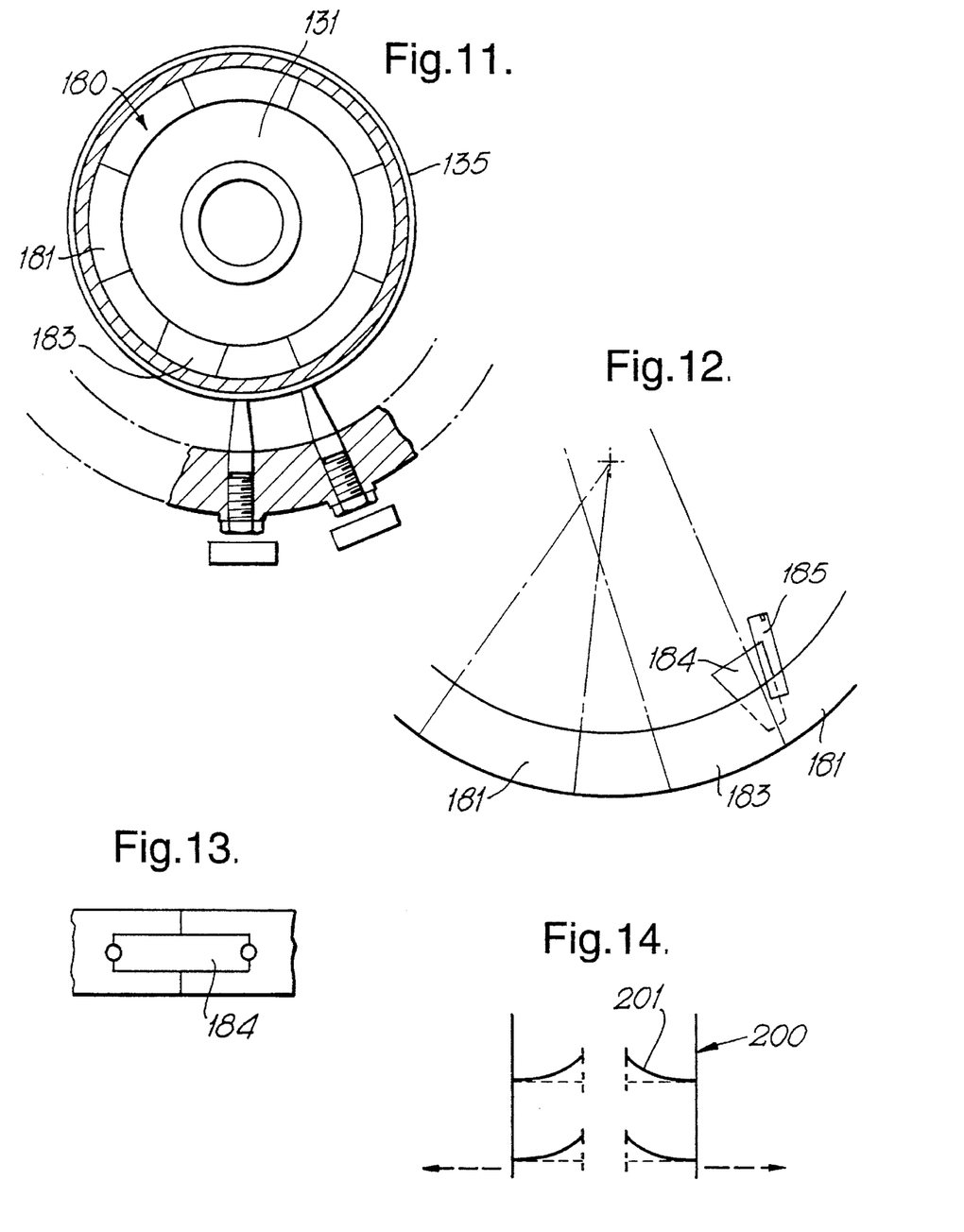
FIG. 11 shows schematically a principle of supporting a hollow deformable structure during friction welding.
FIGS. 12 and 13 show detail of the arrangement of FIG. 11.
FIG. 14 shows a new construction of blum.

FIG. 11 shows another way of supporting a hollow article, such as a drum during friction welding. The interior surface of the wall of the drum, or disc, is supported by an internal support wall 180. The internal support wall 180 is made from several wedge-shaped "bricks" which are built up to form the wall. One of the bricks 183 has parallel side faces, instead of radial side faces, to enable it to be the last brick inserted. This last brick 183 will also have a locking mechanism to lock it in place.

The wall 180 may be provided in the plane of the region to be welded, or above or below the region to be welded, or may even be provided above and below the region to be welded. Two walls may be provided, one above the weld region and one below in the case where there is an obstruction in the plane, for example when the membrane 131 of a drum or disc is at the axial height of the region to be welded. The internal built wall 180 may be used in combination with the external compression force applied to the drum or disc. The combination of the two may ensure that the drum or disc is not in fact compressed too much, despite the existence of the plurality of compression forces angularly spaced around its periphery.

FIGS. 12 and 13 show a suitable locking mechanism for the last brick 183. A wedge 184 is provided received in appropriate half-recesses between the brick 183 and an adjacent brick 181, and a grub screw 185 provided to drive the wedge 184 home. Another grub screw is provided to remove the wedge.

During friction welding of a drum or disc having internal membrane or fingers 131, we may deliberately bend the or each membrane 131 (or spoke or finger) out of its relaxed condition prior to or during compression of the disc or drum if the principle shown in FIG. 2 is to be used. When the membranes are in a radial lane in their relaxed state this ensures that the membranes 131 flex as the disc is compressed in a known manner, rather than having some flex upward and some flex downwards, and thereby potentially having differently stressed, and even differently shaped, membranes after the welding operation has been completed and the compression forces removed.

FIG. 14 shows a new construction of blum 200 which uses a deflection of its internal support structures 201 to provide a radially outward force. The support structures 201 are curved in their relaxed condition. During friction welding of a blade to the outside of the drum the structures 201 are bent axially to push them into a generally radial plane shown in dotted lines. Thus the blum is stressed with a generally radially outward force which is in the opposite direction to the radial compressive forces 140 of FIG. 4.

It will of course be appreciated that any of the many aspects of the invention or inventions disclosed herein can be used in combination with any other of the aspects of the invention or inventions.

We claim:

1. A workpiece holder for holding a workpiece having first and second opposed ends and an outer surface during a friction welding operation, comprising:

a first clamp member adapted to engage the first end of the workpiece, a second clamp member adapted to engage the second end of the workpiece, the first and second clamp members being movable towards each other to engage the first and second ends of the workpiece, the second clamp member comprising a drum-like structure defining a chamber or recess into which the workpiece is partially received in use, the second clamp member being adapted to support the workpiece at a height within the chamber such that a location on the workpiece at which the friction welding operation joins a radially disposed component to the workpiece is a portion of the outer surface of the workpiece, and clamp force means for urging the first and second clamp members to frictionally engage the workpiece with a force substantially greater than a weld pressure and a weld reciprocatory friction force acting on the radially disposed component and the workpiece.

2. A workpiece holder as claimed in claim 1 further comprising height adjusting means for adjusting the height of the workpiece within the chamber of the drum-like structure.

3. A workpiece holder as claimed in claim 2 wherein the height adjusting means comprises a spacer inserted between the said one clamp member and the workpiece, said spacer being selected from a range of possible spacers of different heights.

4. A workpiece holder as claimed in claim 2 wherein the height adjusting means comprises a height adjustable platform carried by the said one clamp member and having a range of positions.

5. A workpiece holder as claimed in claim 1 further comprising means for adjusting the circumferential position of the workpiece.

6. A workpiece holder as claimed in claim 1 further comprising reinforcing means for engaging a generally annular or cylindrical workpiece to assist the drum-like structure of the second clamp member to react forces exerted on the workpiece during a friction welding operation.

7. A workpiece holder as claimed in claim 6 wherein the reinforcing means is adapted to engage the exterior of the workpiece.

8. A workpiece holder as claimed in claim 7 wherein the reinforcing means comprises external compression means.

9. A workpiece holder as claimed in claim 8 wherein the external compression means comprises a multiplicity of means for applying a radial force to the external surface of the workpiece.

10. A workpiece holder as claimed in claim 9 wherein the external compression means comprises a multiplicity of rams spaced apart surrounding the workpiece.

11. A workpiece holder as claimed in claim 7 wherein the reinforcing means comprises clamp members arranged to engage the workpiece adjacent a welding location.

12. A workpiece holder as claimed in claim 6 wherein the reinforcing means is adapted to engage the workpiece internally thereof.

13. A workpiece holder as claimed in claim 12 adapted to reinforce a workpiece consisting of a generally cylindrical exterior having at least one axially internal annulus co-axial with the cylindrical exterior, comprises a reinforcing diaphragm adapted to engage said at least one annulus and to apply to said annulus an axial bias force.

14. A workpiece holder as claimed in claim 13 adapted to reinforce a workpiece of the kind referred to and having a plurality of axially spaced internal annuli, further comprises means for indexing the reinforcing diaphragm to engage selectively each of said internal annuli.

15. A friction welding machine for welding a component to a workpiece including a workpiece holder for holding a workpiece during a friction welding operation, comprising:

a first clamp member adapted to engage a first end of the workpiece, a second clamp member adapted to engage a second end of the workpiece, the first and second clamp members being movable towards each other to engage the first and second ends of the workpiece, the second clamp member comprising a drum-like structure defining a chamber or recess into which the workpiece is partially received in use, the second clamp member being adapted to support the workpiece at a height within the chamber such that when the first and second clamp members are engaged with the workpiece, the first clamp member is spaced from a rim of the second clamp member to expose a portion of the outer surface of the workpiece to provide a location on the workpiece at which the friction welding operation joins a radially disposed component to an outer surface of the workpiece, and clamp force means for urging the first and second clamp members to frictionally engage the first and second ends of the workpiece with a force substantially greater than a weld pressure and a weld reciprocatory friction force acting on the radially disposed component and the workpiece.

* * * * *